United States Patent
Engene et al.

(10) Patent No.: US 10,870,467 B2
(45) Date of Patent: Dec. 22, 2020

(54) OFFSHORE MATERIAL HANDLING SYSTEM AND MATERIAL HANDLING METHOD

(71) Applicant: Kværner AS, Lysaker (NO)

(72) Inventors: Knut Engene, Trondheim (NO); Trond Granli, Trondheim (NO); Odd Inge Stuedal, Trondheim (NO)

(73) Assignee: Kværner AS, Lysaker (NO)

( * ) Notice: Subject to any disclaimer, the term of this patent is extended or adjusted under 35 U.S.C. 154(b) by 0 days.

(21) Appl. No.: 15/547,191

(22) PCT Filed: Jan. 29, 2016

(86) PCT No.: PCT/NO2016/050015
§ 371 (c)(1),
(2) Date: Jul. 28, 2017

(87) PCT Pub. No.: WO2016/122334
PCT Pub. Date: Aug. 4, 2016

(65) Prior Publication Data
US 2018/0022424 A1 Jan. 25, 2018

(30) Foreign Application Priority Data
Jan. 30, 2015 (NO) .................................. 20150140

(51) Int. Cl.
*B63B 27/30* (2006.01)
*B63B 27/10* (2006.01)
(Continued)

(52) U.S. Cl.
CPC .............. *B63B 27/30* (2013.01); *B63B 27/08* (2013.01); *B63B 27/10* (2013.01); *B63B 27/12* (2013.01); *B63B 27/16* (2013.01); *B63B 35/44* (2013.01)

(58) Field of Classification Search
CPC ......... B63B 27/30; B63B 35/44; B63B 27/16; B63B 27/08; B63B 27/12; B63B 27/10; B66C 13/02
(Continued)

(56) References Cited

U.S. PATENT DOCUMENTS 2,577,979 A * 12/1951 Pierson ..................... E04G 5/06
248/235
2,601,888 A * 7/1952 Schopper ............. B60N 2/3095
108/152
(Continued)

FOREIGN PATENT DOCUMENTS

CA 2465409 A1 9/2005
EP 0307089 A1 3/1989
(Continued)

OTHER PUBLICATIONS

Åhlander, Anna, "International Search Report" for PCT/NO2016/050015, dated Jun. 27, 2016, 5 pages.

*Primary Examiner* — Lynn E Schwenning
(74) *Attorney, Agent, or Firm* — Shackelford, Bowen, McKinley & Norton, LLP

(57) ABSTRACT

An offshore material handling system including an offshore crane carrying vessel(4), an installation structure (1) fixed to the seabed and projecting above the sea level is described. The installation structure(1) includes a material handling distribution system on board the installation structure(1). The material handling system includes an independent platform structure(3) for temporary attachment to the installation structure(1) and temporary use on the installation structure (1) for load transfer.

10 Claims, 5 Drawing Sheets

(51) Int. Cl.
  *B63B 27/08* (2006.01)
  *B63B 27/12* (2006.01)
  *B63B 27/16* (2006.01)
  *B63B 35/44* (2006.01)

(58) Field of Classification Search
  USPC .............. 414/142.7, 137.5, 137.9, 139.5
  See application file for complete search history.

(56) References Cited

U.S. PATENT DOCUMENTS

| | | | | |
|---|---|---|---|---|
| 3,064,829 A * | 11/1962 | Winfrey et al. | .......... | B66B 9/00 |
| | | | | 187/404 |
| 3,804,268 A * | 4/1974 | Barron | .............. | B66D 1/48 |
| | | | | 254/273 |
| 3,863,736 A * | 2/1975 | McWilliams | .......... | B64D 1/22 |
| | | | | 182/150 |
| 4,310,277 A * | 1/1982 | Robinson | ............... | B63B 21/00 |
| | | | | 212/257 |
| 4,448,396 A * | 5/1984 | Delago | .................. | B66D 1/52 |
| | | | | 254/340 |
| 4,519,727 A * | 5/1985 | Mitchell | ............... | E21B 33/037 |
| | | | | 166/335 |
| 4,544,137 A * | 10/1985 | Johnson | ................. | B66C 13/02 |
| | | | | 212/308 |
| 4,802,553 A * | 2/1989 | Waters | .................. | E04G 1/152 |
| | | | | 182/179.1 |
| 4,825,976 A * | 5/1989 | Wyse | ..................... | E04G 1/152 |
| | | | | 182/119 |
| 4,909,350 A * | 3/1990 | Jacobs | ................. | E04G 5/062 |
| | | | | 182/82 |
| 5,104,080 A * | 4/1992 | Berger | ............... | A47J 37/0786 |
| | | | | 108/152 |
| 5,279,193 A * | 1/1994 | Huffine | .................. | E04G 1/152 |
| | | | | 182/119 |
| 5,535,974 A * | 7/1996 | Savitski | .................. | E04G 5/062 |
| | | | | 248/246 |
| 5,967,262 A * | 10/1999 | Krause | .................... | E04G 1/152 |
| | | | | 182/222 |
| 6,659,703 B1 * | 12/2003 | Kirkley | ................... | B63B 27/10 |
| | | | | 414/138.2 |
| 6,964,552 B1 | 11/2005 | Krabbendam | | |
| 7,735,606 B1 * | 6/2010 | Norton | ..................... | E04G 5/06 |
| | | | | 182/186.9 |
| 7,748,195 B2 * | 7/2010 | Keith | ........................ | E04G 5/04 |
| | | | | 182/87 |
| 7,802,636 B2 * | 9/2010 | Childers | ................. | E21B 19/20 |
| | | | | 175/52 |
| 8,523,490 B2 | 9/2013 | Wilkinson, Jr. | | |
| 2008/0298898 A1 * | 12/2008 | Roodenburg | .......... | E02B 17/00 |
| | | | | 405/196 |
| 2010/0175606 A1 * | 7/2010 | Pollack | .................. | B63B 35/44 |
| | | | | 114/333 |
| 2012/0321393 A1 | 12/2012 | Wilkinson, Jr. | | |
| 2013/0202360 A1 * | 8/2013 | Bollmohr | ................ | E02B 17/02 |
| | | | | 405/205 |
| 2014/0196948 A1 * | 7/2014 | Kannegaard | .......... | E21B 19/143 |
| | | | | 175/5 |

FOREIGN PATENT DOCUMENTS

| | | |
|---|---|---|
| RU | 2029839 C1 | 2/1995 |
| RU | 2116413 C1 | 7/1998 |
| WO | WO-2012/007002 A2 | 1/2012 |
| WO | WO-2012/067519 A1 | 5/2012 |
| WO | WO-2014/204304 A1 | 12/2014 |

* cited by examiner

OFFSHORE MATERIAL HANDLING SYSTEM AND MATERIAL HANDLING METHOD

The present invention relates to an offshore material handling system including a crane carrying vessel, a fixed installation structure projecting above the sea level, which installation structure includes a material handling distribution system on board the installation structure.

The present invention also relates to a method for offshore lifting operations between a crane carrying vessel and a fixed offshore installation structure projecting above the sea level, which installation structure includes a material handling system onboard the installation structure.

From WO 2012/007002, a system and method for movement of payloads between a service vessel and an offshore wind turbine by use of a conveyor ramp, is known. However, on page 1 of this publication they partly tell away from the subject matter of the present patent application by the following statement (quotation): "The lifting of components directly off a service vessel alongside the turbine requires that the lifting crane have a rating which is significantly in excess of that required to lift the same component in an onshore environment. The movement of the component as a result of the movement of the vessel in response to the action of waves, current and wind can significantly increase the loading on the crane depending on the particular conditions".

From U.S. Pat. No. 8,523,490 B2, temporary platforms and methods of securing such platforms to an offshore structure, is shown.

The present concept has been developed primarily for use with unmanned wellhead platforms without having an offshore crane installed onboard. An example of such platform is the "Subsea on Stick"® (SoS) platform designed by the applicant. This was developed to simplify logistics for load handling at sea for lifting materials to and from an offshore installation by use of offshore crane at vessel, and is also especially prepared for handling well intervention equipment, and to minimize the need for maintenance and certification of lifting equipment offshore. Another purpose was to expand options with regards to performing operational work on unmanned wellhead platforms, including other fixed installations having the same requirements to load handling without having an offshore crane installed onboard.

The present invention has the effect that the requirements to the crane can be transferred from an installation to a vessel.

Offshore lifts on fixed installations are subject to strict requirements regarding type of crane, certification, maintenance, and operations. The use of offshore cranes on fixed installations results in that a substantial need of man hours are necessary to carry out maintenance and offshore certification of the lifting equipment. With an unmanned installation like the SoS the need for man hours on board is substantially reduced.

This can be done by performing the offshore lifts by means of external equipment and only perform internal material handling onboard the installation with lifting appliances and equipment having reduced need for offshore certification and only perform checks by their own personal with visual control, and reduced extent of work like less maintenance and simplified operation for high degree of exploitation with personal possessing multifunction competence etc.

Thus, the present platform/crane system is designed and used such that a particular method leads to that an especially designed crane/offshore crane onboard the installation is no longer needed to perform a complete load handling. With the onboard lifting appliances, the respective loads are distributed internally and thus there are no requirements to certified offshore crane onboard the installation, unmanned wellhead platform or SoS An offshore crane is present on the vessel and this crane has all necessary certifying for kay/onshore facility.

This method resolves several requirements to the regulations to be more appropriate. In addition, for unmanned wellhead platforms, it will be possible to handle heavier equipment prepared for temporary location onboard to carry out well intervention, for example.

Well intervention can simplest be explained in that the wells are maintained in order to produce more oil or gas for a longer period of time, which leads to very good economy when using unmanned wellhead platforms instead of subsea installations, for example.

Said in a simple way, the handling of loads (standard load carriers, especially designed load carriers for well intervention and wireline operations, goods and materials) can be the decisive point weather to exploit a field or not with unmanned wellhead platforms and one may therefore say that those having resolved this, will have a great advantage relative to the competitors.

The challenge with resolving the concept has traditionally been that bigger cranes have been designed, or made dependent of huge crane vessels or specially designed crane vessels, to be able to lift equipment to a high level or on top of the installation. The reason why the lifts are getting high and loading areas are little accessible, is that structures, such as the load platforms, are subjected to severe sea stresses when close to the sea surface. This entails consequences for the structure, not only locally, but can also influence on entire integrity of the installation. At the wave influenced zone the installation structure shall have as "clean" or "smooth" structures as possible. Also, if lifting to a high level or on top of the installation from a vessel, may lead to lifting operations into blind zones, which is not acceptable and may increase risk for incidents above the acceptable.

Thus the basic idea according to the present invention was to provide a load handling system of the introductory said kind, which system is distinguished in that the load handling system includes an independent platform structure for temporary attachment on the installation structure and temporary use on the installation structure for load transfer.

The platform structure is to be hung temporarily onto the installation structure at a level above sea so low that conventional service/supply vessels with conventional heave compensated cranes can be used. In addition, the different regulations worldwide in respect of visibility, control of the load, requirements to the cranes etc. are now resolved in a very simple way by the present concept.

In one embodiment of the present invention, the load handling distribution system onboard the installation structure includes an onboard crane or lift able to elevate or lower a load from or to the independent platform structure.

The crane onboard could be of any suitable kind, such as a gantry crane or a slewing crane.

The vessel may also be of any suitable kind of vessel, such as a supply vessel or a service vessel.

The installation can be an unmanned wellhead platform, by the applicant also termed a "Subsea on Stick"® (SoS).

In one embodiment the independent platform structure can be a corner platform structure.

According to the present invention, also a method of the introductory said kind is provided, which method comprises the following steps: a) the crane on the crane carrying vessel brings an independent platform structure from the vessel onto the installation structure for temporary use as a load station on the installation structure, b) the crane on the crane carrying vessel brings a load from the vessel onto the independent platform structure, c) the load handling distribution system brings the load to predetermined level of the installation structure.

In addition, the method may include the following step: d) the load handling distribution system brings a second load from the vessel onto the independent platform structure and continues according to step c) above.

Further, the method may include the following step: e) the crane on the crane carrying vessel releases and brings the independent platform structure back from the installation structure onto the vessel.

According to the present invention also an independent platform structure for temporary attachment to the installation structure and use on the installation structure defined above is provided, which platform structure includes attachment means in form of hooks or other fixation means to be attached or hooked onto the installation structure at suitable installation structure, such as braces or beams adapted to thrust against the installation structure.

Further, the platform structure may include a ladder or gangway to enable forming a walkway from the platform onto the installation structure.

Preferably, the platform structure and interface on the installation structure is to be standardized such that one and the same platform structure can be used on several installation structures.

EXAMPLE OF EMBODIMENT

While the various aspects of the present invention has been described in general terms above, a more detailed and non-limiting example of an embodiment will be described in the following with reference to the drawings, in which.

Figure 6:
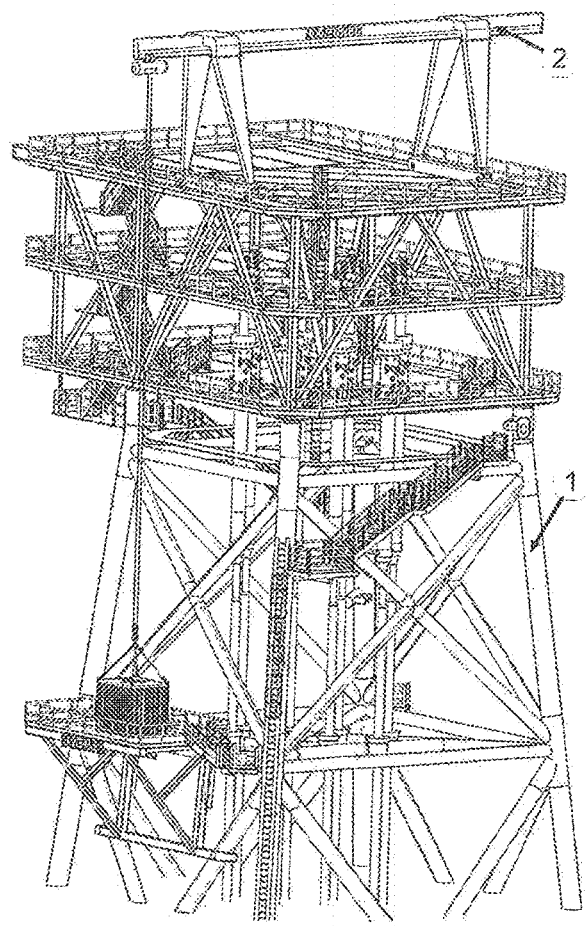
FIG. 6 is perspective views of the installation structure with the independent platform structure attached thereto, gantry crane for internal material handling between the independent platform structure to landing area ready to lift standard load carrier.
Figure 7:
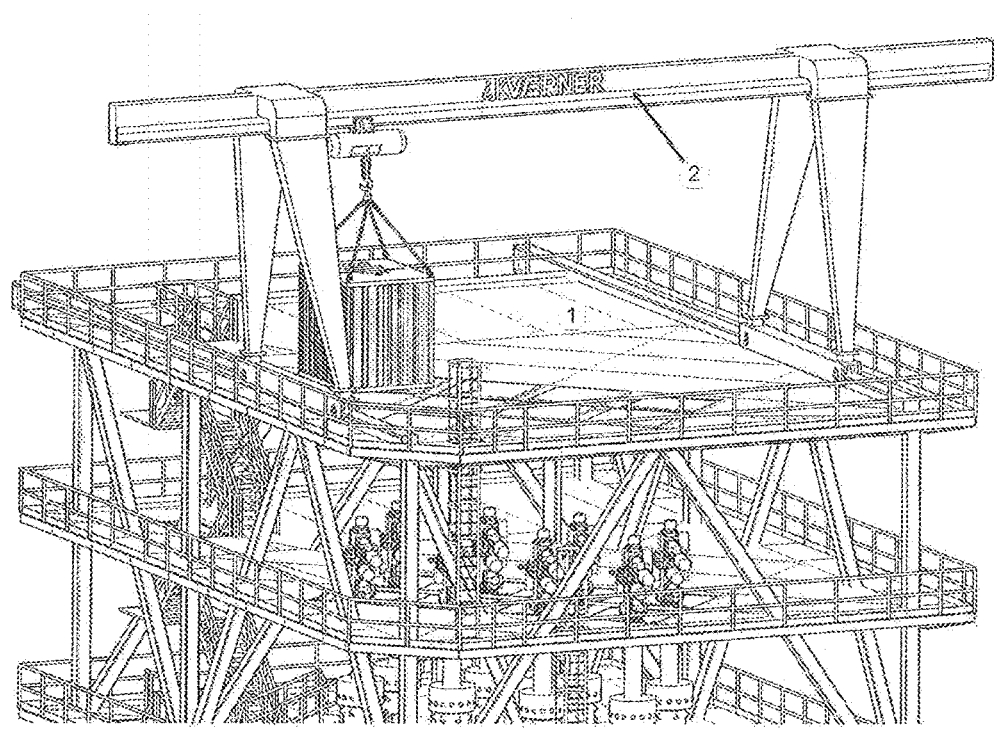
FIG. 7 show the top deck with gantry carne, ready for internal material distribution of standard load carrier.

Reference is firstly made to FIG. 6 showing a perspective view of an offshore installation structure 1 of a type called Subsea on Stick®. The installation structure 1 is made up as an open trusswork structure projecting above the surface of the sea. A Gantry crane 2 is located on top of the installation structure 1 and is straddling over a top deck of the installation structure 1. The Gantry crane 2 is moveable on rails back and forth, while a traverser carriage with lifting gear and hook, is running traverse to such back and forth direction, in order to be able to put off loads at any point all over the top deck.

Figure 3:
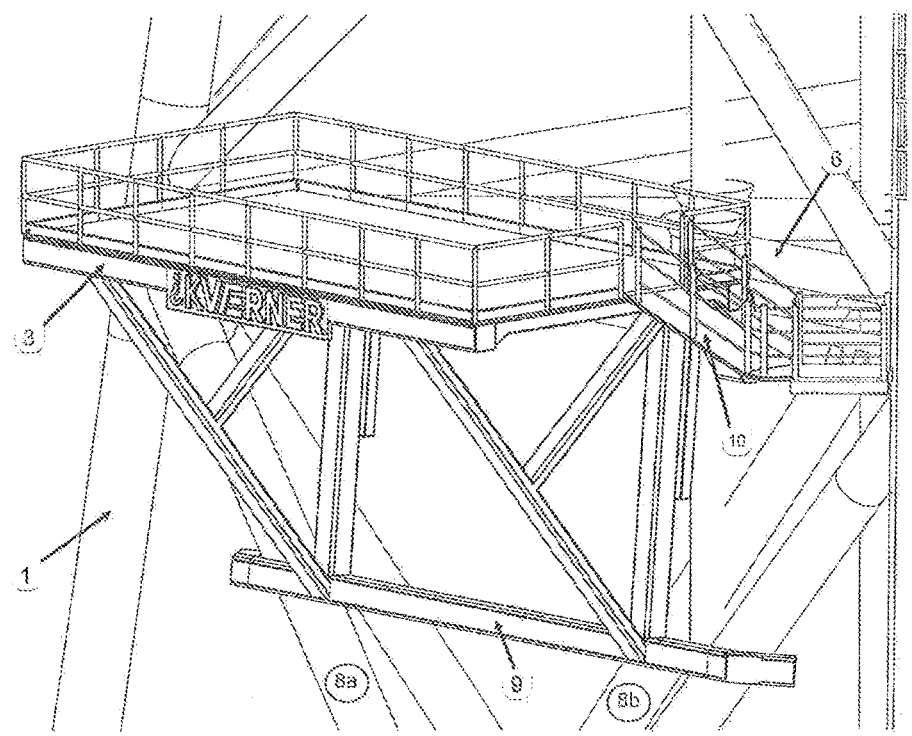
FIG. 3 shows the independent platform structure attached to the installation structure.

FIG. 3 shows the installation structure 1 according to FIG. 6 with the detail of the independent detachable platform structure 3 attached to the installation structure 1 some distance above the sea level. The platform structure 3 illustrated, is provided with two spaced apart heavy hooks designed to hook onto a substantially horizontal truss bar on the installation structure 1.

Figure 2:
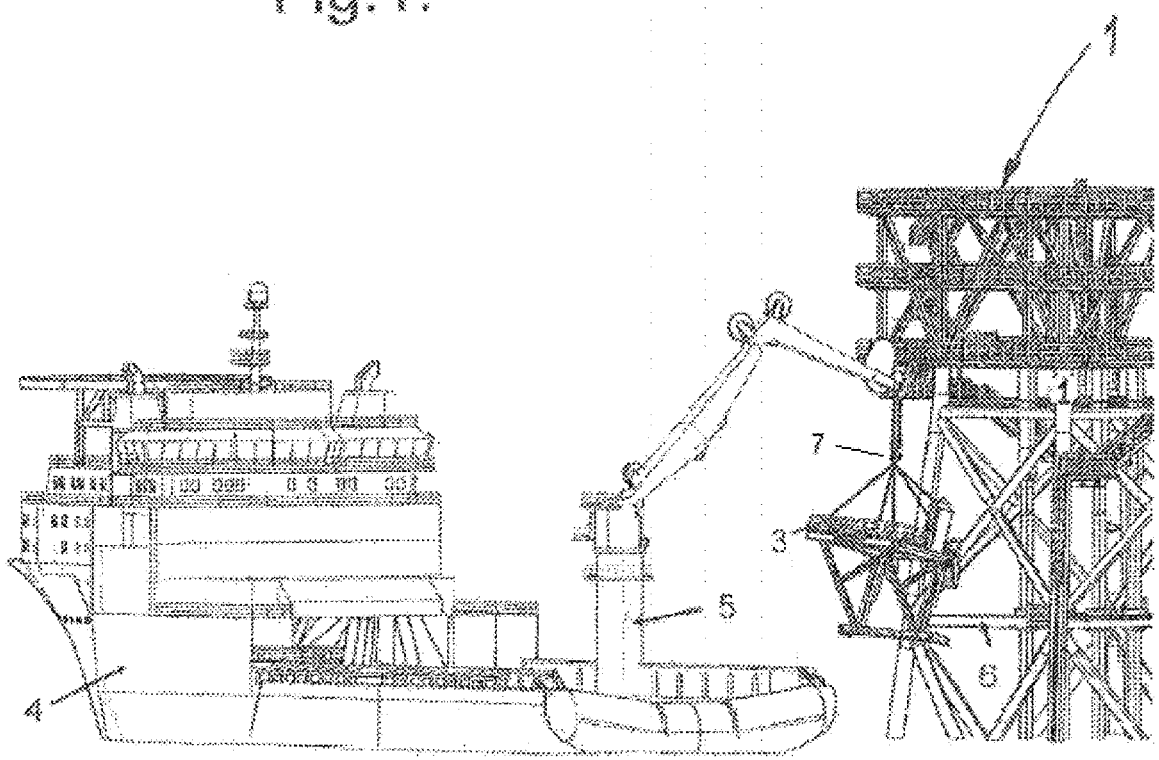
FIG. 2 is a perspective view of the crane on vessel being used to lift the independent platform structure from vessel for temporary attachment on the installation structure.

FIG. 2 shows the various components of the system according to the invention. The system includes a supply boat 4 having a crane 5 onboard, in addition to the above described installation structure 1 and the detachable independent platform structure 3.

Figure 1:
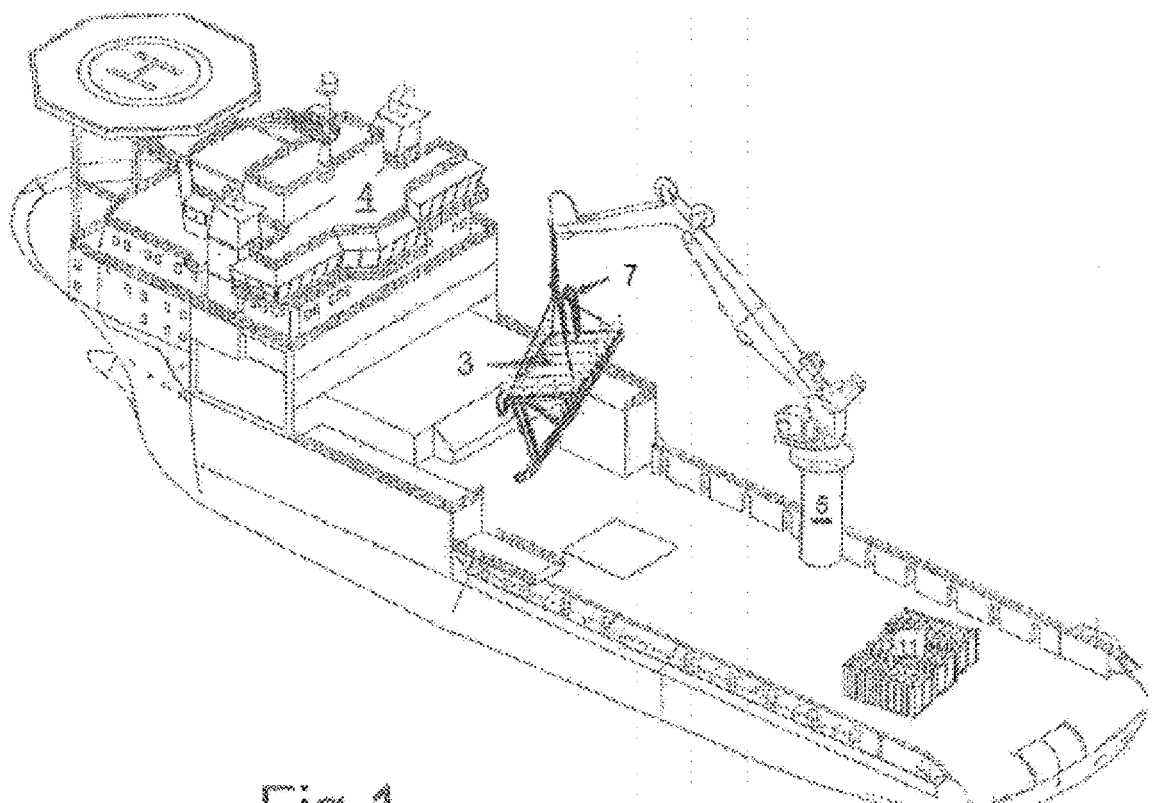
FIG. 1 is a perspective view of the installation structure, the vessel with offshore crane and the independent platform structure, and standard load carrier.

FIG. 1 shows a first step of performing the method steps according to the invention. A hook 7 on the crane 5 is connected to the platform structure 3 lifted off the boat deck at this stage. The hook 7 is more clearly shown in FIG. 2 when the platform structure 3 is lifted a distance above the deck of the supply boat 4 ready for the transfer over the boat rail.

FIG. 2 shows the platform structure 3 after having been swung out over the rail and to the proximity of the installation structure 1. The next and last step is shown in FIG. 2 where the platform structure 3 is hooked onto a horizontal truss beam 6 on the installation structure 1.

In FIG. 3 the platform structure 3 is securely attached to the installation structure 1. The lower part of the platform 3 is resting against two respective inclined truss beams 8a, 8b by means of a substantially horizontal thrust bar 9 on the platform 3 structure. A ladder or ramp gangway 10 is shown to the right hand side on the platform structure 3. As shown in FIG. 3, the gangway 10 can be pivoted to establish a walkway over to a staircase structure on the installation structure 1.

Preferably, the platform structure 3 and interface on the installation structure 1 is to be standardized such that one and the same platform structure 3 can be used on several installation structures 1.

Figure 4:
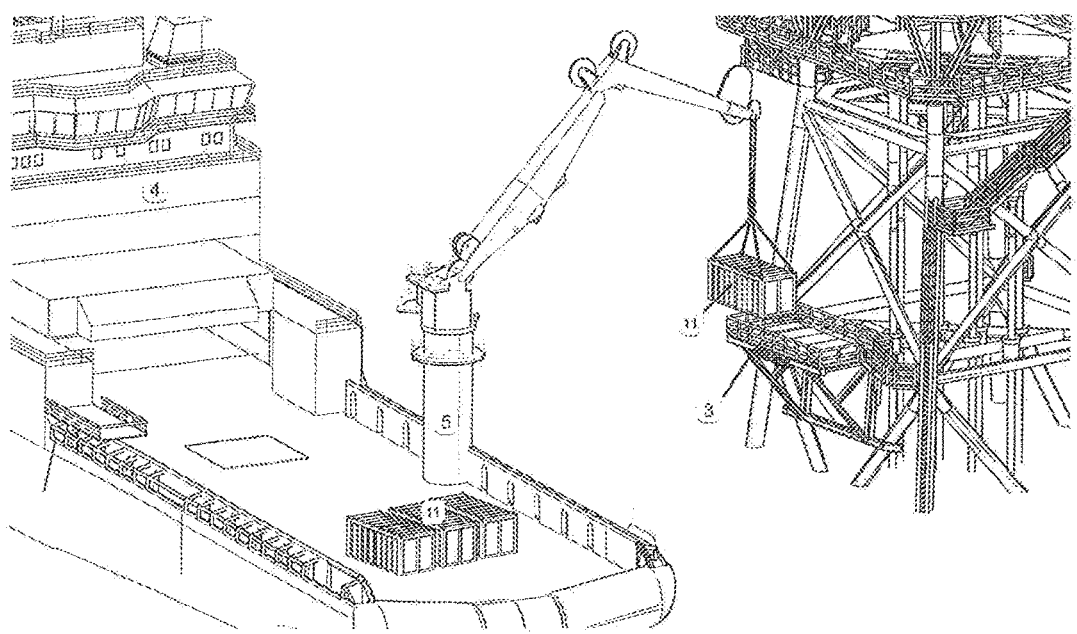
FIG. 4 shows lift between vessel and the installation structure.
Figure 5:
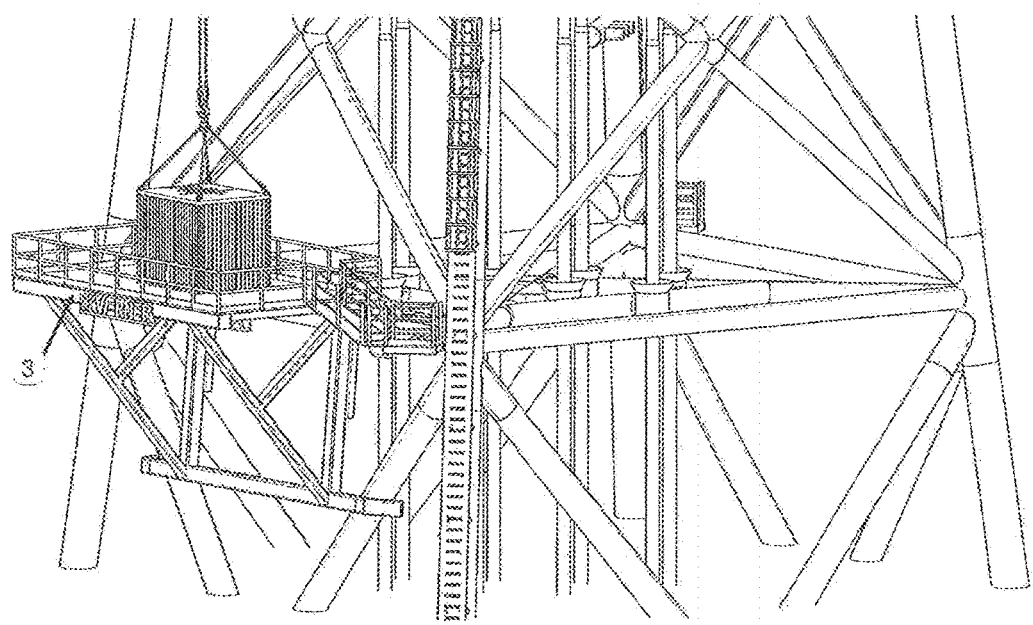
FIG. 5 shows the independent platform structure attached to the installation structure with standard load carrier ready for internal material handling.

Next step is to bring a load 11, or several loads, from the supply vessel 4 over to the platform structure 3, as illustrated in FIGS. 1 and 4. This is done in a per se conventional manner.

FIG. 4-7 shows sequential internal transportation steps on board the installation structure 1 from the platform structure 3 to the top deck of the installation structure 1. This is done by means of the Gantry crane 2.

Figure 8:
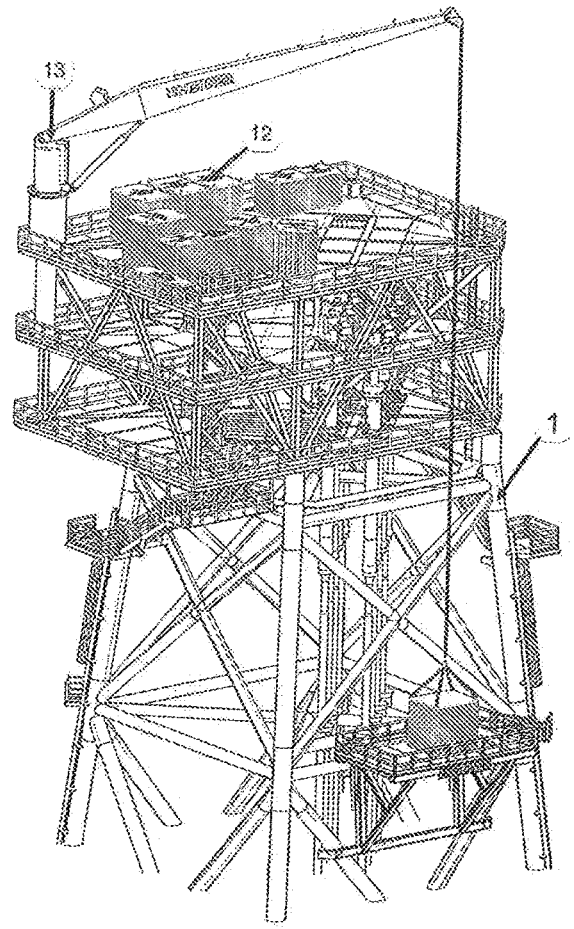
FIG. 8 shows an alternative crane structure onboard the installation structure.

FIG. 8 shows a situation where a number of loads have been transferred to the top deck of the installation structure 1 by repeated transportation steps as indicated by FIGS. 4 to 7. Also an intervention equipment 12, or tool, has been installed and erected on the top deck of the installation structure 1 with alternative crane structure onboard the installation structure 1.

Figure 9:
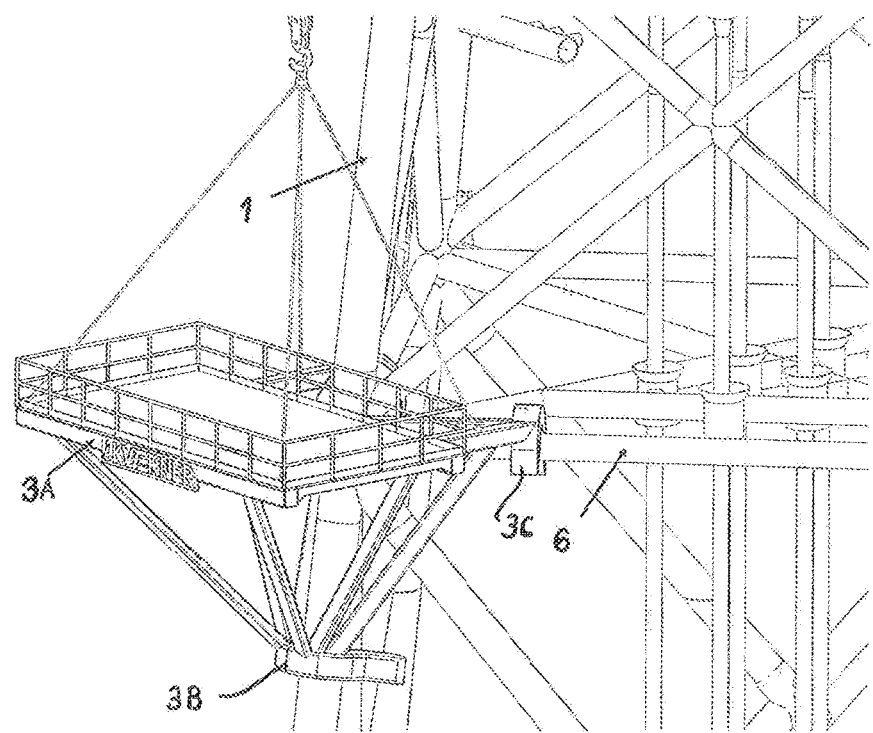
FIG. 9 shows in perspective view an alternative embodiment if the invention showing a corner platform structure to be installed on a corner of the installation structure.

FIG. 9 shows in perspective view an alternative embodiment if the invention showing a corner platform structure 3A to be installed at a corner of the installation structure 1.

As in the FIG. 3 embodiment, the independent and detachable corner platform structure 3A is attached to the installation structure 1 some distance above the sea level. The platform structure 3A is provided with two spaced apart heavy hooks 3C designed to hook onto respective horizontal truss bars 6, which respective horizontal truss bars 6 are located on respective sides of the installation 1.

In FIG. 9, the platform structure 3A is securely attached to the installation structure 1. The lower part 3B of the platform structure 3A is resting against a corner column extending in an inclined direction from the sea and to the top of the installation structure 1. A ladder or ramp gangway (not shown) can be installed in order to establish a walkway over to a staircase structure on the installation structure 1.

The invention claimed is:

1. An offshore material handling system comprising:
   a service or supply vessel having a conventional heave compensated crane;
   an installation structure fixed to the seabed and projecting above sea level, said installation structure having an open trusswork that supports offshore drilling operations, said installation structure further comprising a lifting appliance on board; and
   a platform structure having at least two hooks that are sized to be temporarily hung onto the open trusswork of said installation structure, and at least one horizontal truss bar connected to said platform structure by truss beams;
   wherein said truss bar rests against said installation structure below said platform structure, and in combination with said hooks, supports said platform structure on said installation structure;
   wherein said platform structure is placed by the conventional heave compensated crane at a level on said installation structure within reach of both the conventional heave compensated crane and the lifting appliance;
   wherein said platform structure acts as a temporary, independent, load station supported on said installation structure; and
   wherein said independent platform structure further comprises means for attachment to a crane hook on board said service or supply vessel so that said platform structure is lifted as a single unit onto said installation structure by the conventional heave compensated crane.

2. The offshore material handling system according to claim 1, wherein said lifting appliance on board the installation structure is either a gantry crane, slewing crane, winches, or other lifting appliances able to elevate or lower a load from or to different levels internally on the installation structure.

3. The offshore material handling system according to claim 1, wherein said installation structure is either an unmanned wellhead platform (UWP), or any offshore installation fixed to the seabed.

4. The offshore material handling system according to claim 1, wherein said platform structure is a corner platform structure.

5. The offshore material handling system according to claim 1, wherein said platform structure is attached to the installation structure a distance above the sea level.

6. The offshore material handling system according to claim 1, wherein said platform structure includes a ladder or gangway to enable forming a walkway from said platform structure onto said installation structure.

7. The offshore material handling system according to claim 1, wherein the platform structure further comprises a guard rail.

8. A method for offshore handling of material between a service or supply vessel having a heave compensated crane and an installation structure fixed to the seabed and projecting above sea level, said installation structure having an open trusswork that supports offshore drilling operations, said installation structure further comprising a lifting appliance on board, said method comprising:
   a) bringing a platform structure as a single unit by the heave compensated crane on said service or supply vessel onto said installation structure at a level within reach of both the heave compensated crane of said service or supply vessel and the lifting appliance on board said installation structure, wherein said platform structure comprises hooks that are sized for temporary attachment onto the open trusswork of said installation structure, said platform structure further comprising at east one horizontal truss bar that is connected to said platform structure by truss beams, and that rests against said installation structure below the platform structure, and the combination of said hooks and said horizontal truss bar support said platform structure on said installation structure;
   b) bringing a load from said heave compensated crane on said service or supply vessel onto said platform structure; and
   c) bringing said load from said platform structure to a predetermined level and location on said installation structure by the lifting appliance.

9. The method according to claim 8, wherein, prior to step c), the following step is performed:
   bringing a second load by said heave compensated crane on said service or supply vessel from said service or supply vessel onto said platform structure.

10. The method according to claim 8, wherein said method includes the following step:
    releasing, after step c), the platform structure from the installation structure and bringing said platform structure by the service or supply vessel back from said installation structure and onto said service or supply vessel.

* * * * *